(12) United States Patent
Ishibashi

(10) Patent No.: US 10,020,666 B2
(45) Date of Patent: Jul. 10, 2018

(54) POWER SUPPLY CONTROL DEVICE, BATTERY DEVICE, POWER SUPPLY SYSTEM, AND POWER SUPPLY CONTROL METHOD

(71) Applicant: Sony Corporation, Tokyo (JP)

(72) Inventor: Yoshihito Ishibashi, Tokyo (JP)

(73) Assignee: Sony Corporation, Tokyo (JP)

(*) Notice: Subject to any disclaimer, the term of this patent is extended or adjusted under 35 U.S.C. 154(b) by 141 days.

(21) Appl. No.: 14/651,843

(22) PCT Filed: Nov. 26, 2013

(86) PCT No.: PCT/JP2013/081816
§ 371 (c)(1),
(2) Date: Jun. 12, 2015

(87) PCT Pub. No.: WO2014/097834
PCT Pub. Date: Jun. 26, 2014

(65) Prior Publication Data
US 2015/0318718 A1 Nov. 5, 2015

(30) Foreign Application Priority Data

Dec. 21, 2012 (JP) ................................. 2012-280019

(51) Int. Cl.
*H02J 7/00* (2006.01)
*H02J 5/00* (2016.01)
(Continued)

(52) U.S. Cl.
CPC ............... *H02J 7/007* (2013.01); *H02J 3/32* (2013.01); *H02J 3/382* (2013.01); *H02J 5/00* (2013.01);
(Continued)

(58) Field of Classification Search
CPC ............... H02J 3/32; H02J 7/34; H02J 7/0018
(Continued)

(56) References Cited

U.S. PATENT DOCUMENTS 6,104,967 A 8/2000 Hagen et al.
6,654,387 B1 * 11/2003 Beser .................. H04L 12/2801
370/485
(Continued)

FOREIGN PATENT DOCUMENTS

CN 102396097 A 3/2012
CN 102810874 A 5/2012
(Continued)

OTHER PUBLICATIONS

Machine Translation of JP 2010151756 A.*
No Author Listed, System Management Bus (SMBus) Specification, Version 2.0, XP-002309393, Aug. 3, 2000, 59 pages.

*Primary Examiner* — David V Henze-Gongola
(74) *Attorney, Agent, or Firm* — Wolf, Greenfield & Sacks, P.C.

(57) ABSTRACT

Provided is a power supply control device including a command sending unit configured to deliver a polling command to a bus line, and a battery registration unit configured to give an identifier to a battery device that has responded to the polling command within a predetermined response period. The command sending unit delivers information of the identifier to the bus line for the battery device to which the battery registration unit gives the identifier and delivers, to the bus line, a command for the battery device to which the identifier is given.

11 Claims, 11 Drawing Sheets

(51) Int. Cl.
*H02J 3/32* (2006.01)
*H02J 7/02* (2016.01)
*H02J 7/34* (2006.01)
*H02J 3/38* (2006.01)

(52) U.S. Cl.
CPC ............... *H02J 7/02* (2013.01); *H02J 7/34* (2013.01); *H02J 3/383* (2013.01); *H02J 3/386* (2013.01); *H02J 2007/005* (2013.01); *Y02E 10/563* (2013.01); *Y02E 10/566* (2013.01); *Y02E 10/763* (2013.01); *Y02E 70/30* (2013.01)

(58) Field of Classification Search
USPC ........................................................ 320/128
See application file for complete search history.

(56) References Cited

U.S. PATENT DOCUMENTS

| | | | | |
|---|---|---|---|---|
| 2008/0101351 A1* | 5/2008 | Nguyen | ............ | H04L 29/12839 370/389 |
| 2011/0006603 A1* | 1/2011 | Robinson | ................ | G06F 1/263 307/31 |
| 2011/0025124 A1* | 2/2011 | Brabec | ................ | B60L 11/1861 307/9.1 |
| 2012/0194338 A1* | 8/2012 | Snodgrass | ............ | G08B 21/245 340/539.12 |
| 2012/0310428 A1 | 12/2012 | Katagi et al. | | |

FOREIGN PATENT DOCUMENTS

| | | | |
|---|---|---|---|
| JP | 2001-511367 A | | 8/2001 |
| JP | 2009-232668 A | | 10/2009 |
| JP | 2010-151756 A | | 7/2010 |
| JP | 2010151756 A | * | 7/2010 |
| JP | 2012-060835 A | | 3/2012 |
| JP | 2012-120432 A | | 6/2012 |
| JP | 2012-249374 A | | 12/2012 |
| JP | 2012-252580 A | | 12/2012 |
| WO | WO 2012/145102 A2 | | 10/2012 |

* cited by examiner

FIG.8

| NAME | SIZE (BYTE) | DATA | NOTE |
|---|---|---|---|
| COMMAND CODE | 2 | 00 00h | |
| SENDER CONNECTION ID | 1 | 00h | |
| SENDING DESTINATION CONNECTION ID | 1 | FROM 02h TO FFh | FFh = ALL DEVICES<br>FEh = UNESTABLISHED DEVICE<br>OTHER = SPECIFY DEVICE |
| TIME SLOT | 1 | FROM 00h TO FFh | |
| Reserved | 1 | | |

FIG.9

| NAME | SIZE (BYTE) | DATA | NOTE |
|---|---|---|---|
| RESPONSE CODE | 2 | 00 01h | |
| SENDER CONNECTION ID | 1 | | SENDING DESTINATION CONNECTION ID AT TIME OF COMMAND |
| SENDING DESTINATION CONNECTION ID | 1 | 00h | |
| UNIQUE ID | 8 | | |

FIG.10

| NAME | SIZE (BYTE) | DATA | NOTE |
|---|---|---|---|
| COMMAND CODE | 2 | 00 02h | |
| SENDER CONNECTION ID | 1 | 00h | |
| SENDING DESTINATION CONNECTION ID | 1 | FROM 02h TO FDh | DETERMINE CONTROL UNIT |
| UNIQUE ID | 8 | | UNIQUE ID RECEIVED IN Request Device ID |

FIG.11

| NAME | SIZE (BYTE) | DATA | NOTE |
|---|---|---|---|
| RESPONSE CODE | 2 | 00 03h | |
| SENDER CONNECTION ID | 1 | | SPECIFIED CONNECTION ID |
| SENDING DESTINATION CONNECTION ID | 1 | 00h | |
| RESULT | 1 | 01h : OK | |
| Reserved | 1 | | |

POWER SUPPLY CONTROL DEVICE, BATTERY DEVICE, POWER SUPPLY SYSTEM, AND POWER SUPPLY CONTROL METHOD

TECHNICAL FIELD

The present invention relates to a power supply control device, a battery device, a power supply system, and a power supply control method.

BACKGROUND ART

Batteries are charged by power obtained by utilizing renewable energy. Patent Literature 1 below describes a technique of charging a power storage unit with power generated by a solar power generator or a wind power generator.

In these days, there is an increasing demand for electricity in developing countries. Particularly, in developing countries, mobile phones and smartphones have been widely spread and more wireless base stations for mobile communications are also increasingly installed, so that the demand for electricity to be supplied to wireless base stations for mobile communications is markedly increasing. In such developing countries where the demand for electricity is markedly increasing, not only power generated by existing power plants but also the demand for electricity obtained by utilizing the renewable energy as described above is considered to increase.

In developed countries such as Japan, the power grid is well established and the power supply is stable, and thus an uninterruptible power supply (UPS) is mainly used in general as a backup power supply during power outage. Even when the power outage occurs, the power is recovered in a short time in developed countries, so that a backup power supply using a small capacity uninterruptible power supply is efficient.

However, in developing countries where the power grid is not well established and the power supply is not stable, once power outage occurs, time of the power outage extends over a long period of time and backup, such as a small capacity uninterruptible power supply, is not effective. Even in developed countries, there is a case that power outage over a long period of time has to occur at the time of disaster and, including the case of developing countries described above, the importance of backup power supply is enhanced.

CITATION LIST

Patent Literature

Patent Literature 1: JP 2009-232668A

SUMMARY OF INVENTION

Technical Problem

In view of the above situation, a demand for a battery server that efficiently controls charge and discharge for a battery device for a backup power supply is considered to increase in the future. Particularly in developing countries where power supply is not stable, in order not to break the power supply, a demand for a battery server that efficiently controls charge and discharge for a plurality of battery devices is assumed to increase.

The present disclosure provides a power supply control device, a battery device, a power supply system, and a power supply control method that are new and improved and capable of efficiently controlling charge and discharge for a battery device.

Solution to Problem

According to the present disclosure, there is provided a power supply control device including a command sending unit configured to deliver a polling command to a bus line, and a battery registration unit configured to give an identifier to a battery device that has responded to the polling command within a predetermined response period. The command sending unit delivers information of the identifier to the bus line for the battery device to which the battery registration unit gives the identifier and delivers, to the bus line, a command for the battery device to which the identifier is given.

According to the present disclosure, there is provided a battery device including a command response unit configured to receive a polling command delivered to a bus line and to respond within a predetermined response period, an identifier obtaining unit configured to obtain an identifier given based on a response from the command response unit, and a charge and discharge control unit configured to control charge and discharge by receiving the command which is delivered to the bus line and the identifier of which is specified.

According to the present disclosure, there is provided a power supply system including a power supply control device, and one or more battery devices. The power supply control device includes a command sending unit configured to deliver a polling command to a bus line, and a battery registration unit configured to give an identifier to the battery device that has responded to the polling command within a predetermined response period. The command sending unit delivers information of the identifier to the bus line for the battery device to which the battery registration unit gives the identifier and delivers, to the bus line, a command for the battery device to which the identifier is given. The battery device includes a command response unit configured to receive the polling command delivered from the power supply control device to the bus line and respond within a predetermined response period, an identifier obtaining unit configured to obtain the identifier given by the power supply control device based on a response from the command response unit, and a charge and discharge control unit configured to control charge and discharge by receiving the command which is delivered from the power supply control device to the bus line and the identifier of which is specified.

According to the present disclosure, there is provided a power supply control method including delivering a polling command to a bus line, giving an identifier to a battery device that has responded to the polling command within a predetermined response period, delivering information of the identifier to the bus line for the battery device to which the identifier is given, and delivering, to the bus line, a command for the battery device to which the identifier is given.

Advantageous Effects of Invention

As described above, according to the present invention, it is possible to provide a power supply control device, a battery device, a power supply system, and a power supply control method that are new and improved and are capable of efficiently controlling charge and discharge for a battery device.

BRIEF DESCRIPTION OF DRAWINGS

FIG. 8 is an illustration of a configuration of a Request Device ID command.

FIG. 9 is an illustration of a configuration of a response to the Request Device ID command.

FIG. 10 is an illustration of a configuration of a Set Communication ID command.

FIG. 11 is an illustration of a configuration of a response to the Set Communication ID command.

DESCRIPTION OF EMBODIMENTS

Figure 1:
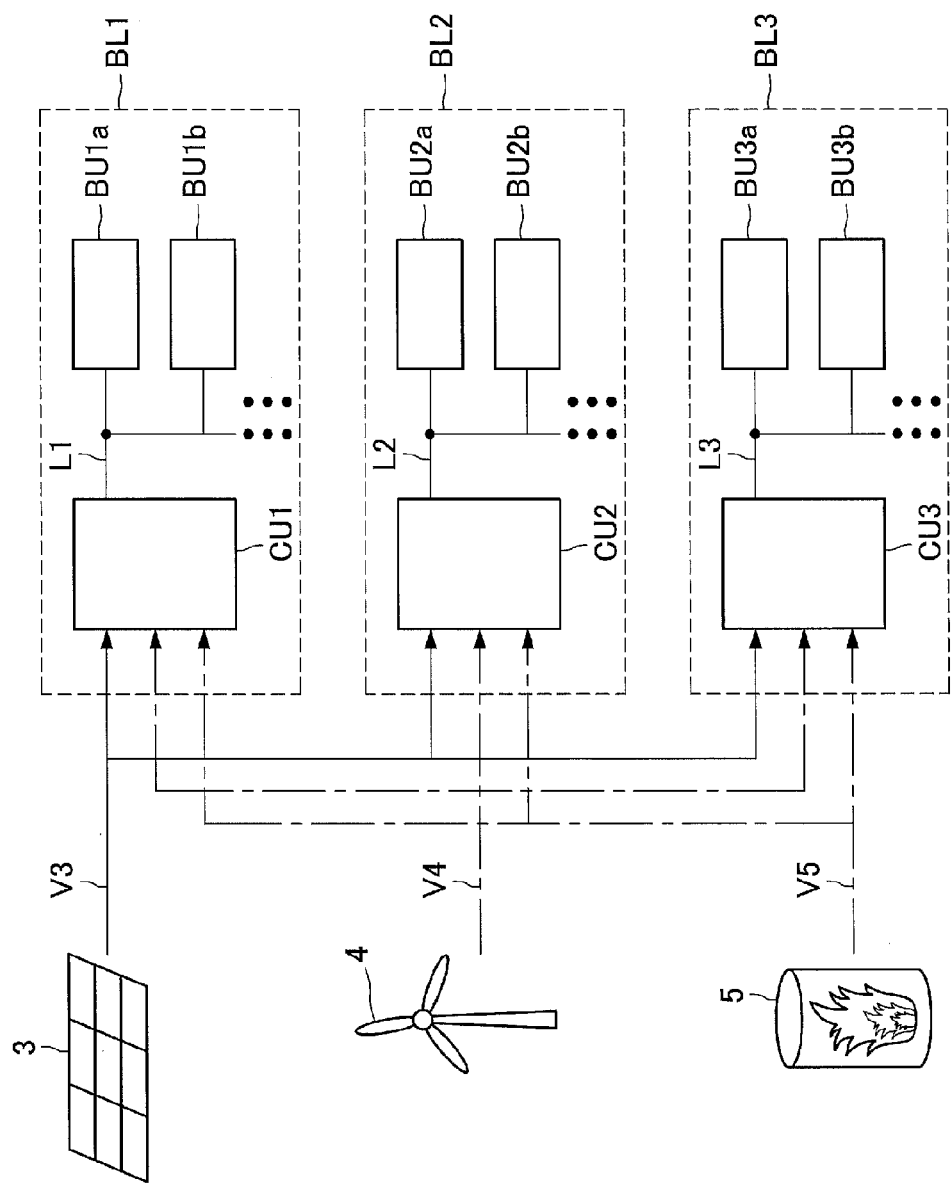
FIG. 1 is an illustration of an exemplary configuration of a power supply system 1 according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Descriptions are given in the following order.
<1. One embodiment of the present disclosure>
 [Exemplary system configuration]
 [Exemplary battery server configuration]
 [Exemplary battery configuration]
 [Exemplary system behavior]
<2. Conclusion>
<1. One Embodiment of the present disclosure>
 [Exemplary system configuration]

Firstly, with reference to the drawings, an exemplary configuration of a power supply system according to an embodiment of the present disclosure is an illustration. FIG. 1 is an illustration of an exemplary configuration of a power supply system 1 according to an embodiment of the present disclosure. Descriptions are given below to an exemplary configuration of the power supply system 1 according to an embodiment of the present disclosure using FIG. 1.

To the power supply system 1, output from a plurality of power generators, for example, is supplied. As such power generators, solar power generators, wind power generators, and biomass power generators are exemplified. In FIG. 1, a solar power generator 3 is schematically illustrated by solar panels. A wind power generator 4 is illustrated schematically by a windmill. A biomass power generator 5 is schematically illustrated by a tank and flame in the tank. An existing solar power generator is applicable to the solar power generator 3. It is similar for the wind power generator 4 and the biomass power generator 5.

The power generators generate power based on energy present in a surrounding environment, such as light, heat, vibration, radio waves, a temperature difference, and an ion concentration difference, for example. Such power generator may also be configured with a device that generates power by system power (grid) or human power. The plurality of power generators may also be power generators of a same type.

A direct current (DC) voltage obtained by each power generator is supplied to subsequent blocks. When an alternative current (AC) voltage is obtained by the power generator, the alternative current voltage is converted to a direct current voltage to be supplied to the subsequent blocks. The system 1 has a plurality of blocks. As the plurality of blocks, a block BL1, a block BL2, and a block BL3 are exemplified. When individual blocks do not have to be distinguished, they are referred to as a block BL as appropriate. Note that, a block is an expression for convenience of description and does not have a particular meaning. The configuration and the like of the block BL are described later.

The block BL is connected to each power generator in parallel. A direct current voltage V3 supplied from the solar power generator 3 is supplied to the block BL1, the block BL2, and block BL3. A direct current voltage V4 supplied from the wind power generator 4 is supplied to the block BL1, the block BL2, and block BL3. A direct current voltage V5 supplied from the biomass power generator 5 is supplied to the block BL1, the block BL2, and block BL3.

Although the values of the voltage V3, the voltage V4, and the voltage V5 may vary depending on the size of the device and the like, descriptions are given here as the voltage V3, the voltage V4, and the voltage V5 being voltages varying within a range from 75 volt (V) to 100 V. In FIG. 1, the voltage V3 is illustrated with solid lines, the voltage V4 is illustrated with dash dotted lines, and the voltage V5 is illustrated with dash two dotted lines.

The exemplary configuration of the power supply system 1 according to an embodiment of the present disclosure has just been described above using FIG. 1. Next, descriptions are given to an exemplary configuration of a block included in the power supply system 1 according to an embodiment of the present disclosure.

Figure 2:
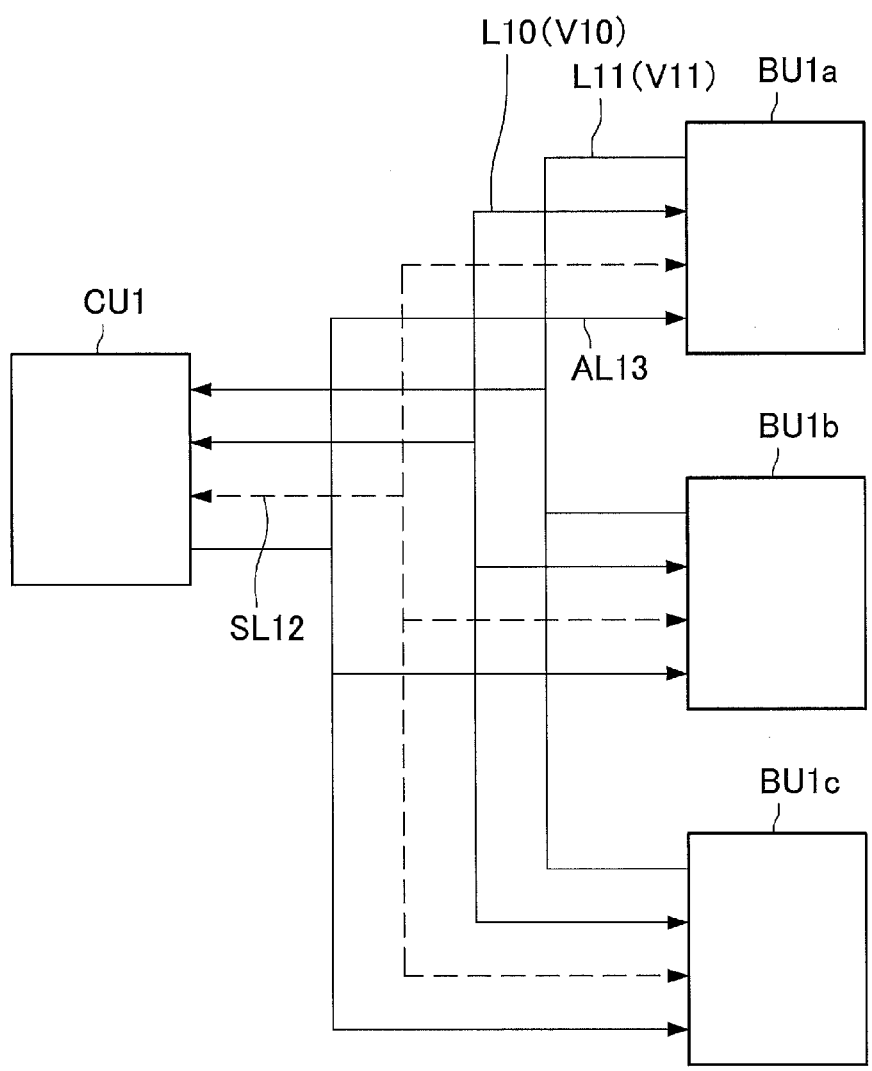
FIG. 2 is an illustration of an exemplary configuration of a block BL1 included in the power supply system 1 according to an embodiment of the present disclosure.

FIG. 2 is an illustration of an exemplary configuration of the block BL1 included in the power supply system 1 according to an embodiment of the present disclosure. Descriptions are given below to an exemplary configuration of the block BL1 included in the power supply system 1 using FIG. 2.

For example, a battery unit BU1$a$, a battery unit BU1$b$, and a battery unit BU1$c$ are connected to a control unit CU1. When individual battery units do not have to be distinguished, they are referred to as a battery unit BU1 as appropriate. In FIG. 1, the battery unit BU1$a$ and the battery unit BU1$b$ are illustrated.

The control unit CU1 is provided with, for example, a plurality of ports, and the battery unit BU1 is attachable and detachable to each port even during operation. That is, it is possible to appropriately change the number of battery units BU1 that are connected to the control unit CU1. For example, in a situation where the battery unit BU1$a$, the battery unit BU1$b$, and the battery unit BU1$c$ are connected to the control unit CU1, it is possible to connect a new battery unit to the control unit CU1. For example, in a situation where the battery unit BU1a, the battery unit BU1b, and the battery unit BU1c are connected to the control unit CU1, it is possible to detach the battery unit BU1b from the control unit CU1.

The battery unit BU1 is connected to the control unit CU1 via a bus line L1. As illustrated in FIG. 2, the bus line L1 includes, for example, a power line L10 to transmit power from the control unit CU1 to the battery unit BU1 and a power line L11 to transmit power from the battery unit BU1 to the control unit CU1. The bus line L1 further includes a signal line SL12 for communication between the control unit CU1 and each battery unit BU1 and an activation control line AL13 for activation of each battery unit BU1.

Although power transmission and communication are described to be carried out by wire in the following description, power transmission and communication may also be carried out wirelessly. In this case, the bus line L1, which is a physical line, does not have to be provided.

Via the power line L10, a direct current voltage V10 is supplied from the control unit CU1 to the battery unit BU1. To a battery unit BU1 instructed to charge among the plurality of battery units BU1, charge is carried out based on the voltage V10. One battery unit BU1 may be charged and a plurality of battery units BU1 may also be charged.

From a battery unit BU1 that is instructed to discharge, a direct current voltage V11 is outputted. The voltage V11 is supplied through, for example, the control unit CU1 to an external device, which is a load. The voltage V11 may also be directly supplied to an external device without going through the control unit CU1. To a battery unit BU1 during discharge may be configured not to be charged and may also be configured to be charged. Similarly, a battery unit BU1 during charge may be configured not to be discharged and may also be configured to be discharged.

The communication between the control unit CU1 and each battery unit BU1 is in accordance with a specification, such as a system management bus (SMBus) and a universal asynchronous receiver-transmitter (UART), for example. The signal line SL12 is a line standardized for the battery units BU1, and a control command is transmitted over the signal line SL12. For example, a control command is delivered from the control unit CU1 to a predetermined battery unit BU1.

By a control command, it is possible to independently control the individual battery units BU1. The battery unit BU1 is capable of identifying a port number of the port to which it is connected. For example, in the header of the control command, an identifier indicating a port number is described. The battery unit BU1 is capable of identifying whether or not to be a control command to itself by analyzing the header of the control command.

Further, the battery unit BU1 is capable of notifying the control unit CU1 of information of itself by communication. The battery unit BU1 is capable of notifying the control unit CU1 of a remaining capacity of, for example, a battery that the battery unit BU1 has by communication. An identifier indicating the port number is described in header of a notification signal from the battery unit BU1 to the control unit CU1. The control unit CU1 is thus capable of distinguishing which battery unit BU1 the notification signal is from. Similarly, other battery units BU1 are also capable of distinguishing a notification signal not to itself.

Using the plurality of battery units BU1, a form of use as follows, for example, is considered. A control command that instructs charge is transmitted from the control unit CU1 to the battery unit BU1a, and the battery unit BU1a executes control for charged. A control command that instructs discharge is transmitted from the control unit CU1 to the battery unit BU1b, and the battery unit BU1b executes control for discharge. The battery unit BU1c is used as a standby power supply. For example, when the remaining capacity of the battery unit BU1b decreases, a battery unit to be used is switched from the battery unit BU1b to the battery unit BU1c. The form of use described above is an example and forms of use are not limited to this.

In FIG. 2, the activation control line AL13 provided between the control unit CU1 and each battery unit BU1 is illustrated. The activation control line AL13 is a line for supplying a signal to activate each battery unit BU1 from the control unit CU1 when the control unit CU1 and each battery unit BU1 are connected via the bus line L1.

The configuration of the block BL2 is a configuration identical to, for example, the configuration of the block BL1. The block BL2 has a configuration including a control unit CU2. To the control unit CU2, a battery unit BU2a, a battery unit BU2b, and a battery unit BU2c, for example, are connected via a line L2. In FIG. 1, the battery unit BU2a and the battery unit BU2b are illustrated.

The configuration of the block BL3 is a configuration identical to, for example, the configuration of the block BL1. The block BL3 has a configuration including a control unit CU3. To the control unit CU3, a battery unit BU3a, a battery unit BU3b, and a battery unit BU3c, for example, are connected via a line L3. In FIG. 1, the battery unit BU3a and the battery unit BU3b are illustrated.

Without contradicting other descriptions in the present disclosure, it does not matter even when there is a structural difference between the respective blocks BL. In the following description, there is a case of expressing as an identical configuration to omit a repetitive description, which does not eliminate the presence of a structural difference without contradicting other descriptions in the present disclosure.

The exemplary configuration of the block BL1 has just been described above using FIG. 2. Next, descriptions are given to an exemplary configuration of the control unit CU1 included in the block BL1.

Figure 3:
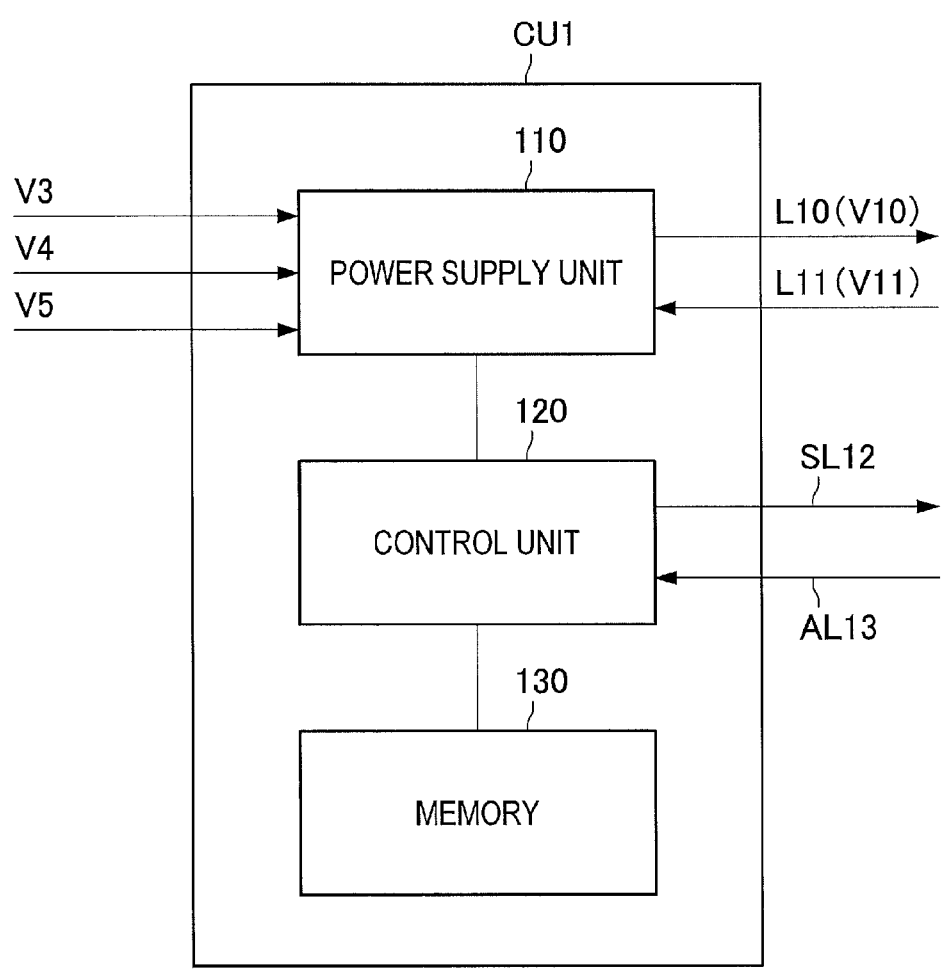
FIG. 3 is an illustration of an exemplary configuration of a control unit CU1 according to an embodiment of the present disclosure.

FIG. 3 is an illustration of an exemplary configuration of the control unit CU1 according to an embodiment of the present disclosure. Descriptions are given below to an exemplary configuration of the control unit CU1 according to an embodiment of the present disclosure using FIG. 3.

As illustrated in FIG. 3, the control unit CU1 according to an embodiment of the present disclosure is configured to include a power supply unit 110, a control unit 120, and a memory 130.

The power supply unit 110 adjusts the direct current voltage V3 supplied from the solar power generator 3, the direct current voltage V4 supplied from the wind power generator 4, and the direct current voltage V5 supplied from the biomass power generator 5 to be a voltage suitable for the battery unit BU1. Having adjusted the voltages of the power supplied from the solar power generator 3, the wind power generator 4, and the biomass power generator 5, the power supply unit 110 supplies the power to the battery unit BU1 via the power line L10. The power supply unit 110 may be configured with, for example, a DC-DC converter.

The power supply unit 110 is also capable of receiving power supply from the battery unit BU1a via the power line L11. The control unit CU1 having received power supply from the battery unit BU1 is capable of supplying the power to other battery units BU1 and also capable of supplying it to an external device, not shown.

The control unit 120 controls behavior of the control unit CU1. Specifically, the control unit 120 executes activation of the battery unit BU1, sending of a command to the battery unit BU1, control of power supply from the power supply unit 110 to the battery unit BU, and the like. For example, the control unit 120 is configured with a control unit, such as a central processing unit (CPU) and others.

The memory 130 retains data that is used for control of behavior of the control unit CU1 by the control unit 120. For example, the memory 130 is activated retains information of the battery unit BU connected to the bus line L1. The control unit 120 is capable of controlling charge and discharge for the battery unit BU1 connected to the bus line L1 using the information of the battery unit BU retained in the memory 130.

An exemplary configuration of the control unit CU1 according to an embodiment of the present disclosure has just been described above using FIG. 3. Next, descriptions are given to an exemplary configuration of the control unit 120 included in the control unit CU1 according to an embodiment of the present disclosure.

Figure 4:
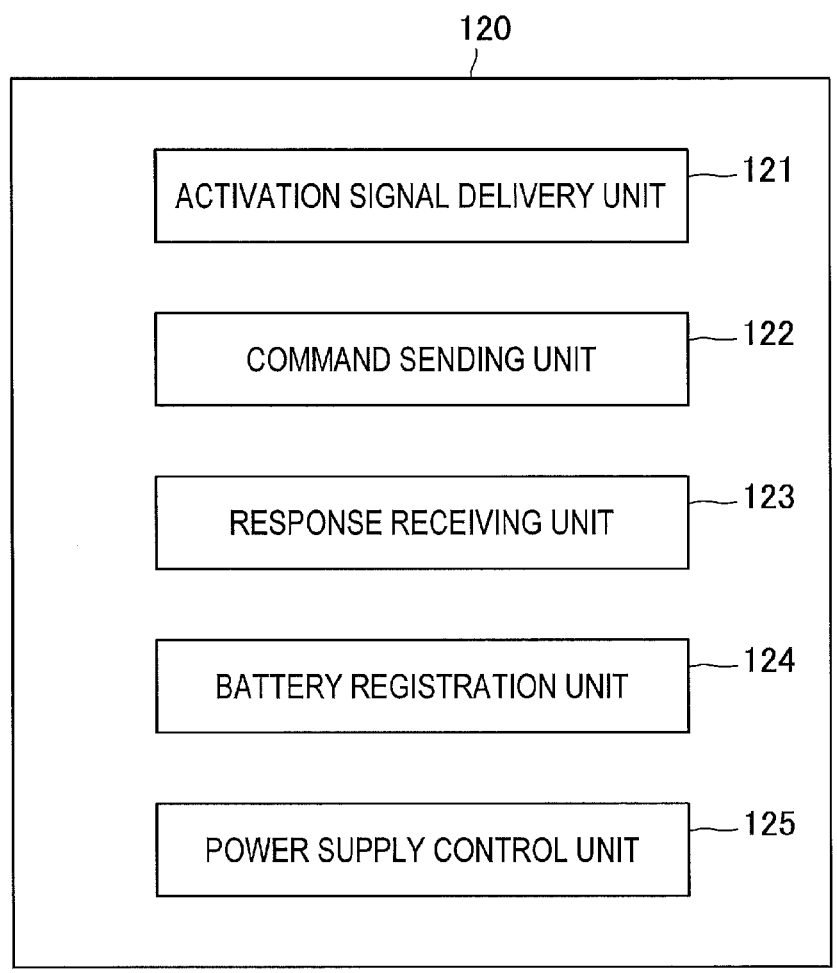
FIG. 4 is an illustration of an exemplary configuration of a control unit 120 included in the control unit CU1 according to an embodiment of the present disclosure.

FIG. 4 is an illustration of an exemplary configuration of the control unit 120 included in the control unit CU1 according to an embodiment of the present disclosure. Descriptions are given below to an exemplary configuration of the control unit 120 included in the control unit CU1 according to an embodiment of the present disclosure using FIG. 4.

As illustrated in FIG. 4, the control unit 120 included in the control unit CU1 according to an embodiment of the present disclosure is configured to include an activation signal delivery unit 121, a command sending unit 122, a response receiving unit 123, a battery registration unit 124, and a power supply control unit 125.

The activation signal delivery unit 121 delivers an activation signal to activate the battery unit BU1 connected to the bus line L1. Although details are described later, the battery unit BU1a is not activated when not connected to the bus line L1 while it is activated by receiving an activation signal from the control unit CU1 when connected to the bus line L1. It is the activation signal delivery unit 121 that creates the activation signal. The activation signal delivery unit 121 emits an activation signal to the activation control line AL13, and when the battery unit BU1 is connected to the bus line L1, the battery unit BU1 becomes in a situation capable of receiving an activation signal that is emitted in the activation control line AL13 to be activated.

The command sending unit 122 generates a command targeting the battery unit BU1 that is connected to the bus line L1 and sends it via the signal line SL12. The command sending unit 122 sends a polling command to understand which battery unit BU1 is connected to the bus line L1, a command to send an identifier to the battery unit BU1, and the like.

The response receiving unit 123 receives a response to the command that is sent to the battery unit BU1 via the signal line SL12 by the command sending unit 122 from the battery unit BU1 via the signal line SL12. When receiving the response received from the battery unit BU1 or not receiving it within a predetermined time period, the response receiving unit 123 causes the control unit 120 to execute process in accordance with the result.

The battery registration unit 124 registers information of the battery unit BU1 connected to the bus line L1 in the memory 130. The battery registration unit 124 makes the battery unit BU1 that returns a response to the polling command sent by the command sending unit 122 within the predetermined time period subjected to be registered in the memory 130. The battery registration unit 124 registers information of the battery unit BU1 to which an identifier is given based on a predetermined rule in the memory 130 in order to identify the battery unit BU1.

That is, the command sending unit 122 sends a polling command at a predetermined interval in order to understand which battery unit BU1 is connected to the bus line L1. When there is a response from the battery unit BU1 to the polling command within the predetermined time period, the response is received by the response receiving unit 123. The information of the battery unit BU1 that have responded is stored in the memory 130 by the battery registration unit 124.

The power supply control unit 125 controls power supply to the battery unit BU1 that is registered in the memory 130 by the battery registration unit 124 and that is connected to the bus line L1. The power supply control unit 125 controls a time period and a voltage of the power supplied to the battery unit BU1 that is connected to the bus line L1 to the power supply unit 110. The power supply unit 110 supplies power to the battery unit BU1 that is connected to the bus line L1 based on the content controlled by the power supply control unit 125.

By the configuration as illustrated in FIG. 4, the control unit 120 included in the control unit CU1 according to an embodiment of the present disclosure is capable of understanding which battery unit BU1 is connected to the bus line L1 and of appropriate power supply to the battery unit BU1 that is connected to the bus line L1.

An exemplary configuration of the control unit 120 included in the control unit CU1 according to an embodiment of the present disclosure has just been described above using FIG. 4. Next, descriptions are given to an exemplary configuration of the battery unit BU1 according to an embodiment of the present disclosure.

Figure 5:
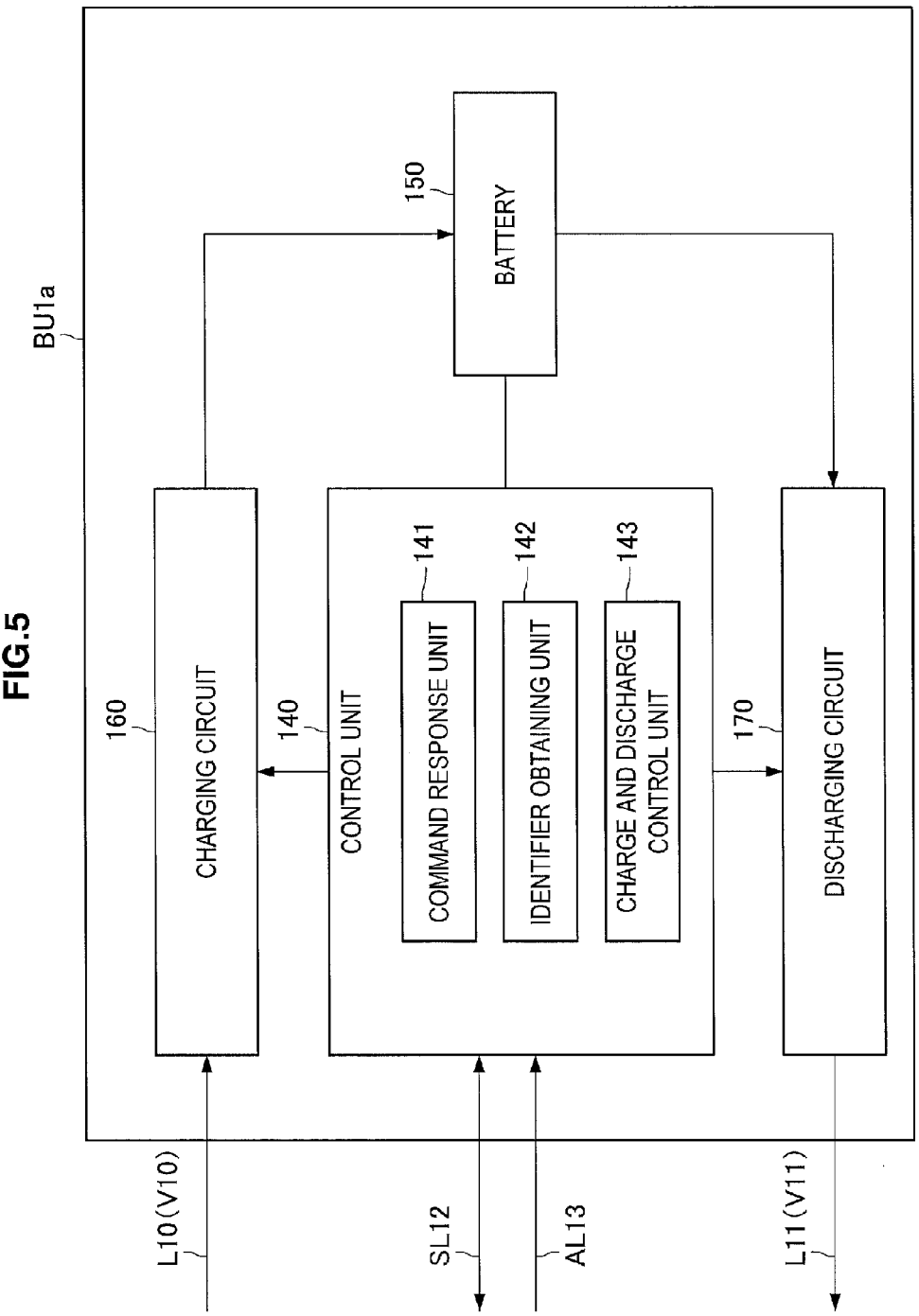
FIG. 5 is an illustration of an exemplary configuration of a battery unit BU1 according to an embodiment of the present disclosure.

FIG. 5 is an illustration of an exemplary configuration of the battery unit BU1 according to an embodiment of the present disclosure. Although the battery unit BU1a is exemplified as the battery unit BU1 in FIG. 5, other battery units also has a configuration equivalent to that is illustrated in FIG. 5. Descriptions are given below to an exemplary configuration of the battery unit BU1 according to an embodiment of the present disclosure using FIG. 5.

As illustrated in FIG. 5, the battery unit BU1 according to an embodiment of the present disclosure is configured to include a control unit 140, a battery 150 a charging circuit 160, and a discharging circuit 170.

The control unit 140 controls behavior of the battery unit BU1. For example, the control unit 140 responds to a command from the control unit CU1 and controls behavior of the charging circuit 160 and the discharging circuit 170.

As illustrated in FIG. 5, the control unit 140 is configured to include a command response unit 141, an identifier obtaining unit 142, and a charge and discharge control unit 143. The command response unit 141 receives a command that is delivered to the signal line SL12 and responds to the command as desired. The identifier obtaining unit 142 obtains information of the identifier given in the control unit CU1. The charge and discharge control unit 143 receives the command that is delivered from the control unit CU1 to the signal line SL12 and that is specified with the identifier and controls charge and discharge.

As described above, the battery unit BU1 is not activated when not connected to the bus line L1 and is activated by receiving an activation signal from the control unit CU1 that is connected to the bus line L1. The control unit 140 starts operation when receiving an activation signal emitted in the activation control line AL13. The control unit 140 may use the battery 150 as a source of power and may also use a power supply provided besides the battery 150 as a source of power.

The battery 150 is a chargeable and dischargeable secondary battery, such as a lead storage battery and a lithium ion battery, and is charged by power supply from the charging circuit 160 and discharged via the discharging circuit 170.

The charging circuit 160 outputs the power supplied from the control unit CU1 via the power line L10 by converting it to power suitable for charging of the battery 150. The charging circuit 160 may be configured with, for example, a DC-DC converter. The charging circuit 160 may also be provided with a protection circuit not to emit a current excessively to the battery 150.

The discharging circuit 170 outputs the power stored in the battery 150 via the power line L11. The discharging circuit 170 may be configured with, for example, a DC-DC converter. By outputting the power stored in the battery 150 via the discharging circuit 170, the battery unit BU1 is capable of supplying power to other devices (that may include the control unit CU1 and other battery units BU). The discharging circuit 170 may also be replaced with a simple electronic switch or relay to discharge the output of the battery without conversion.

An exemplary configuration of the battery unit BU1 according to an embodiment of the present disclosure has just been described above using FIG. 5. Next, descriptions are given to a behavioral example of the control unit CU1 according to an embodiment of the present disclosure.

[Exemplary system behavior]

Figure 6:
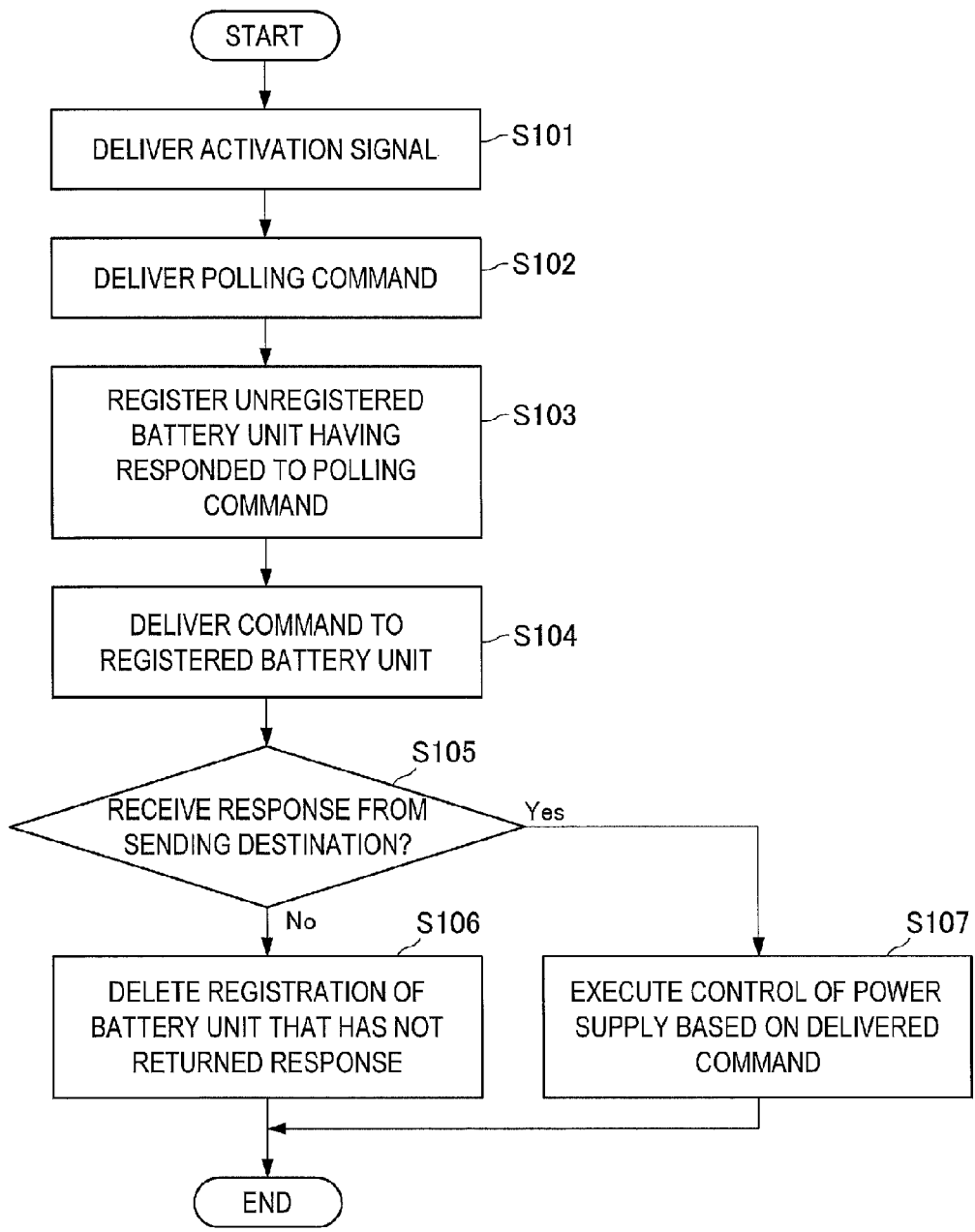
FIG. 6 is a flow chart illustrating a behavioral example of the control unit CU1 according to an embodiment of the present disclosure.

FIG. 6 is a flow chart illustrating a behavioral example of the control unit CU1 according to an embodiment of the present disclosure. The flow chart illustrated in FIG. 6 illustrates behavior of the control unit CU1 when sensing which battery unit BU1 is connected to the bus line L1 and managing information of the battery unit BU1 connected to the bus line L1. Descriptions are given below to a behavioral example of the control unit CU1 according to an embodiment of the present disclosure using FIG. 6.

The control unit CU1 emits an activation signal to the activation control line AL13 (step S101). The process of emitting the activation signal in step S101 is executed by the activation signal delivery unit 121. When connected to the bus line L1, the battery unit BU1 is in a situation capable of receiving an activation signal that is delivered from the control unit CU1. The battery unit BU1 is activated in accordance with reception of the activation signal sent from the control unit CU1.

While emitting an activation signal to the activation control line AL13 in step S101 above, the control unit CU1 sends a polling command at a predetermined interval (step S102). The sending of a polling command in step S102 is executed by the command sending unit 122. The command sending unit 122 sends a polling command at a predetermined interval via the signal line SL12.

When sending the polling command in step S102 above, based on a response from an unregistered battery unit BU1 to the polling command, the control unit CU1 registers the battery unit BU1 that returns the response (step S103). Specifically, for example, the control unit CU1 gives an ID to the battery unit BU1 that returns a response to the polling command and sends the information of the given ID to the battery unit BU1. The registration of the battery unit BU1 in step S103 is executed by, for example, the battery registration unit 124 and the sending of the information of the given ID is executed by, for example, the command sending unit 122.

By giving an ID to the battery unit BU1 that returns the response and sending the information of the given ID to the battery unit BU1, the control unit CU1 establishes a link with the battery unit BU1.

Having registering the battery unit BU1 that returns a response to the polling command in step S103 above, the control unit CU1 subsequently delivers a command to a registered battery unit BU1 through the signal line SL12 (step S104). The command delivered in step S104 is, for example, a command for charge and discharge for the battery unit BU1. The delivery of the command in step S104 is executed by the command sending unit 122. In the command delivered in step S104, the ID given by the battery registration unit 124 is included. The battery unit BU1 to be a target of the command that is delivered in step S104 responds to the control unit CU1 for the command. The response is executed by the command response unit 141.

Having delivered a command in step S104 above, the control unit CU1 assesses whether or not to have received a response to the command (step S105). The assessment in step S105 is executed by, for example, the response receiving unit 123. As a result of the assessment in step S105, when not receiving a response from the battery unit BU1 to the command delivered in step S104 within a predetermined time period (or continuously in a predetermined number of times), the control unit CU1 deletes the registration of the information of the battery unit BU1 that has not returned a response (step S106). The deletion process in step S106 is executed by, for example, the battery registration unit 124. Specifically, by deleting the ID given to the battery unit BU1, the battery registration unit 124 deletes the registration of the information of the battery unit BU1 that has not returned a response. In contrast, as a result of assessment in step S105, when receiving a response from the battery unit BU1 to the command delivered in step S104, the control unit CU1 executes power control based on the command delivered in step S104 to the battery unit BU1 that have returned a response (step S107). The power control based on a command is executed by, for example, the power supply control unit 125.

Although step S101 through step S107 have described as a series of behavior in the example described above, the control unit CU1 may also process a part of the behavior repeatedly. For example, the control unit CU1 may execute step S104 and later after repeating the process until there is no unregistered battery unit in step S102 and step S103, and may also repeatedly execute the process from step S104 to step S107, and after ending instructions to all battery units, go back to step S101 or step S102.

By executing the behavior as illustrated in FIG. 6, the control unit CU1 according to an embodiment of the present disclosure is capable of understanding which battery unit BU1 is connected to the bus line L1 at all timing and of appropriate power supply to the battery unit BU1 that is connected to the bus line L1. Although power is sent only to the battery unit BU1 that is connected to the bus line L1 and is registered in this behavioral example, the control unit CU1 may also send power to the battery unit BU1 regardless of registration. Note that, it is only the battery unit BU1 having received an instruction from the control unit CU1 that that receives the power being sent for use, so that it is substantially same even when power is sent to the battery unit BU1 regardless of registration.

A behavioral example of the control unit CU1 according to an embodiment of the present disclosure has just been described above using FIG. 6. Subsequently, more detailed descriptions are given to behavior of the control unit CU1 according to an embodiment of the present disclosure.

Figure 7:
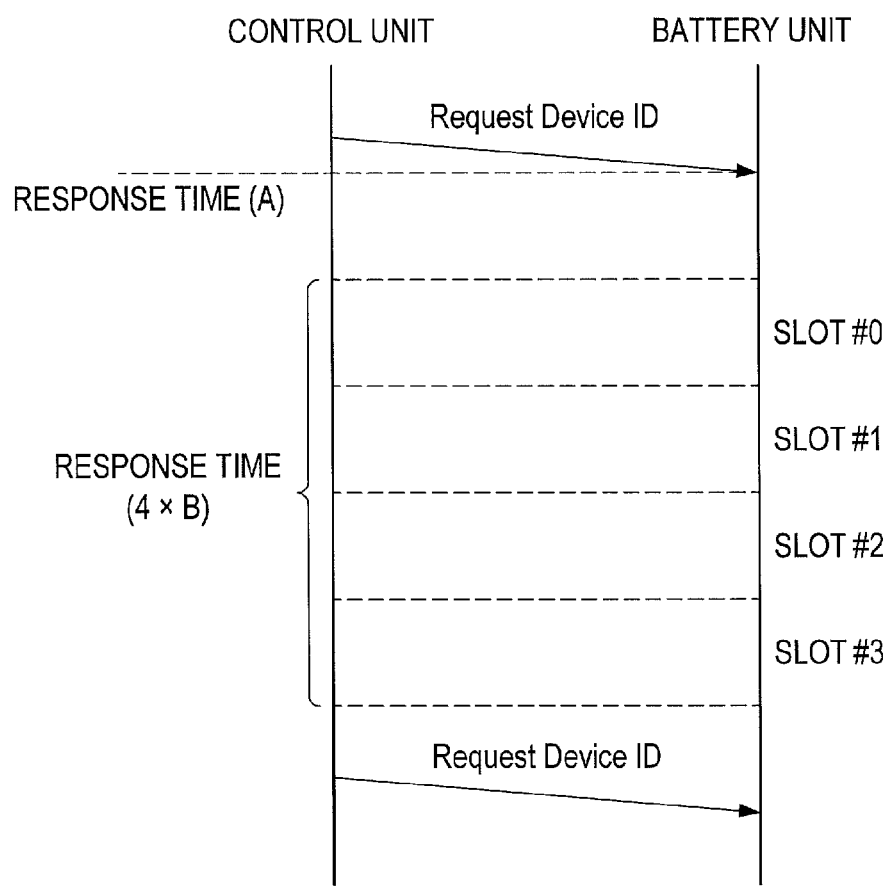
FIG. 7 is an illustration of exchange of a command to establish a link between the control unit CU1 and the battery unit BU1.

FIG. 7 is an illustration of exchange of a command to establish a link between the control unit CU1 and the battery unit BU1. In FIG. 7, a Request Device ID command is exemplified as a command to establish a link between the control unit CU1 and the battery unit BU1.

As illustrated in FIG. 7, the control unit CU1 periodically sends a Request Device ID command via the signal line SL12. The Request Device ID command is equivalent to an example of the polling command in the descriptions above.

In the battery unit BU1 having received a Request Device ID command, the command response unit 141 included in the control unit 140 generates a random number and returns a response including a unique ID in in a slot frame indicated by the generated random number to the control unit CU1 via the signal line SL12. In FIG. 7, four slots of slots #0 through #3 are provided as time slots for response from the battery unit BU1. When a time period for one time slot is B, the time period for a response from the battery unit BU1 becomes 4×B.

Here, in the case that a plurality of battery units BU1 are connected at the same time (for example, when the power is on), the plurality of battery units BU1 return responses at the same time to one command when no measures are taken. When the plurality of battery units BU1 return the responses at the same time, signal collision turns out to occur.

In the present embodiment, in order to establish a link between the control unit CU1 and the battery unit BU1, time sharing is introduced to avoid signal collision. When sending a Request Device ID command, the control unit CU1 adds information of a maximum time slot frame as associated data. Each battery unit BU1 generates a random number of not more than the maximum time slot frame indicated by the data associated with the Request Device ID command. Then, each battery unit BU1 returns a response including a unique ID described below within a time frame indicated by the random number.

By such behavior of the control unit CU1 and the battery unit BU1, the control unit CU1 is capable of identifying individual battery units BU1. Then, after identifying the individual battery units BU1, the control unit CU1 gives a connection ID for each unique ID returned from the battery unit BU1.

For example, the case of two battery units BU1 are linked to the bus line L1 is considered. For example, one battery unit BU1 generates a random number 0 and another battery unit BU1 generates a random number 1. Each battery unit BU1 responds respectively in a different time frame even when the maximum time slot frame is two, so that the control unit CU1 is capable of correctly receiving the data.

When both the two battery units BU1 generate a same random number (for example, 0 and 0, 1 and 1, and the like), the signals collide and thus the control unit CU1 is not capable of correctly receiving the responses. Although the command sending is retried in that case, each battery unit BU1 should generate a different random number eventually, so that the control unit CU1 is capable of identification when each battery unit BU1 generates a different random number.

Descriptions are given to details of the Request Device ID command. FIG. 8 is an illustration of a configuration of a Request Device ID command. FIG. 9 is an illustration of a configuration of a response to a Request Device ID command.

All devices (battery units BU1) are targeted in the case of sending a command having a sending destination connection ID in FIG. 8 of 0xFF, the control unit CU1, and the devices that have not established a link in the case of 0xFE. When a value other than these values is specified, the control unit CU1 targets a device having a connection ID same as the value. The targeted device interrupts the current command process and returns a response in a defined time slot. The devices other than that make no response at all and do not interrupt the process, either.

When a connection destination ID is 0xFF and 0xFE, ACK and NAK are not responded both in the command and the response.

The time slot (response time frame) in the Request Device ID command illustrated in FIG. 8 is used to avoid signal collision caused by responses by a plurality of devices at the same time. While the time slot may take a value from 00h to FFh, an immediate response (the response frame is 1) is indicated when the time slot is 00h, and time slot frames for the specified value are prepared when the time slot is other than 00h. When receiving the Request Device ID command that is delivered from the control unit CU1, the battery unit BU1 generates a random number internally (for example, the command response unit 141 included in the control unit 140) and carries out a response in the time slot frames in accordance with the random number.

Note that, when a Request Device ID command is a query only to a specific battery unit BU1 (that is, when the connection destination ID is other than 0xFE and 0xFF), the battery unit BU1 regards that 00h is specified in the time slot. In the present embodiment, the time period for one time slot is 4 ms. The responding battery unit BU1 responds to the control unit CU1, which is a sender, with the unique ID of itself. The response to the control unit CU1 is carried out by the command response unit 141.

When the connection destination ID in the Request Device ID command is 0xFF and 0xFE, ACK/NAK is not responded in both the command and the response. In the cases other than that, ACK/NAK is responded.

Next, descriptions are given to a Set Communication ID command that is a command of assigning a connection ID to the battery unit BU1 that has established a link and notifying the battery unit BU1 of the connection ID from the control unit CU1.

FIG. 10 is an illustration of a configuration of a Set Communication ID command. FIG. 11 is an illustration of a configuration of a response to a Set Communication ID command.

The control unit CU1 determines a battery unit BU1 that has established a link to be the other party of communication and assigns a connection ID to the battery unit BU1. In the present embodiment, from 02h to FDh may be used for the connection ID. In the present embodiment, the control unit CU1 is assumed to be capable of processing up to 16 devices at the same time. Even when a connection ID is assigned already, the battery unit BU1 changes it to a new connection ID at the time of receiving the Set Communication ID command.

Among the battery unit BU1, devices that do not have a unique ID specified in the Request Device ID command do not respond. When there is no device having a unique ID specified in the Set Communication ID command, there is no response.

The battery unit BU1 having the unique ID specified in the Set Communication ID command responds for ACK after receiving the command, and responds for the response after termination of the internal process. Note that, when a packet has an error, NAK may be replied to the control unit CU1 of the sender not to register the connection ID. Accordingly, when a packet has an error, the battery unit BU1 responds to the control unit CU1 using a previous value, when a connection ID is registered already, and FFh, when not registered, for a sender connection ID.

When receiving the Set Communication ID command, the battery unit BU1 preferably determines whether or not to discard the packet with the unique ID, not with the sending destination connection ID. When the control unit CU1 has given an overlapped connection ID by mistake, the battery unit BU1 that has already established a link resolves the link. In other words, it is the case where the connection ID identical to itself is specified as the sending destination connection ID and the unique ID is different from itself. It is thus possible to resolve the risk of responding to the same connection ID at the same time.

The control unit CU1 confirms a remaining level of all the battery units to which a connection ID is given the Set Communication ID and periodically confirms a status, an internal temperature, a behavioral status, and the like of the battery. The control unit CU1 then issues a charge instruction, a discharge instruction, a stop instruction, and the like to all the battery units to which a connection ID is given. At this point, when the battery unit BU1 is removed from the bus line L1 by an operator, a reaction from the removed battery unit BU1 to a charge instruction, a discharge instruction, a stop instruction, and the like from the control unit CU1 disappears. In such a manner, when the number of times (time period) with no reaction reaches a predetermined number, the control unit CU1 regards that the battery unit BU1 is removed from the bus line L1 and may behave to eliminate it from the registration list.

In the meanwhile, by repeatedly sending a Request Device ID, the control unit CU1 is capable of appropriately registering a battery unit BU1 newly attached to the bus line L1. The control unit CU1 is therefore capable of confirming the entire configuration (that is, what kind of and how many battery units BU1$t$ are connected to the bus line L1) to change an instruction to the battery unit BU1 attached to the bus line L1.

For example, the case that battery units BU1 having a battery remaining level of 10%, 30%, 50%, and 90% are connected to the bus line L1 is considered. In this case, it is assumed that the battery unit BU1 of 10% is charged and the battery unit BU1 of 90% is discharged. When the battery unit BU1 having a remaining level of 10% is removed from the bus line L1 from this situation, the control unit CU1 is capable of issuing a charge instruction to the battery unit BU1 having a remaining level of 30%. It naturally does not matter that the control unit CU1 issues a charge instruction to the battery unit BU1 having a remaining level of 50% or 90%.

When the battery unit having a remaining level of 90% is removed from the bus line L1, the control unit CU1 is capable of issuing a discharge instruction to the battery unit BU1 having a remaining level of 50%. It naturally does not matter that the control unit CU1 issues a charge instruction to the battery unit BU1 having a remaining level of 30% or 10%.

When a battery unit BU1 having a remaining level of 0% is newly connected to the bus line L1, the control unit CU1 is capable of issuing a charge instruction to the battery unit BU1 of 0% instead of the battery unit BU1 having a remaining level of 10%. When a battery unit BU1 of 100% is newly connected to the bus line L1, the control unit CU1 is capable of issuing a discharge instruction instead of the battery unit BU1 having a remaining level of 90%.

The charge and discharge instructions described above are of course merely an example and the control unit CU1 may deliver various instructions in accordance with the status of the battery unit BU1 connected to the bus line L1.

The behavior of the control unit CU1 according to an embodiment of the present disclosure has just been in more detail described above. By establishing a link with the battery unit BU1 as described above, the control unit CU1 according to an embodiment of the present disclosure is capable of delivering a command to instruct the battery unit BU1 to charge and discharge, the battery unit BU1 having established a link to the signal line SL12. For example, the control unit CU1 is capable of delivering a command to instruct the battery unit BU1 to start or stop charging and discharging in accordance with the remaining level of the battery 150, the battery unit BU1 having established a link to the signal line SL12.

For example, when there are a plurality of battery units BU1 that have established a link, the control unit CU1 may instruct power supply to the battery unit BU1 having the lowest remaining level.

2. CONCLUSION

As just described above, according to an embodiment of the present disclosure, provided is a control unit CU1 that senses the presence of a battery unit BU1 connected to a bus line L1, registers information of the battery unit BU1 connected to the bus line L1, and delivers a command for the registered battery unit BU1.

The control unit CU1 delivers a polling command to the bus line L1 at a predetermined interval and waits for a response from the battery unit BU1. The control unit CU1 then registers information of a battery unit BU1 that returns a response within a predetermined time period and delivers a command for the registered battery unit BU1. By sensing the presence of the battery unit BU1, the control unit CU1 is capable of efficiently controlling charge and discharge for the battery unit BU1.

Steps in processes executed by devices in this specification are not necessarily executed chronologically in the order described in a sequence chart or a flow chart. For example, steps in processes executed by devices may be executed in a different order from the order described in a flow chart or may be executed in parallel.

Further, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, by configuring respective functional blocks shown in a functional block diagram as hardware, the hardware can achieve a series of processes.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, although the power supplied to the control unit CU1 is generated by the solar power generator 3, the wind power generator 4, and the biomass power generator 5 in the above embodiment, the present disclosure is not limited to such example. The power supplied to the control unit CU1 is not limited to that produced from natural energy but may also be generated by thermal power, water power, nuclear power, and the like.

Additionally, the present technology may also be configured as below.

(1)

A power supply control device including:

a command sending unit configured to deliver a polling command to a bus line; and a battery registration unit configured to give an identifier to a battery device that has responded to the polling command within a predetermined response period, wherein the command sending unit delivers information of the identifier to the bus line for the battery device to which the battery registration unit gives the identifier and delivers, to the bus line, a command for the battery device to which the identifier is given.

(2)

The power supply control device according to (1), further including:

a power supply control unit configured to control charge and discharge for the battery device to which the battery registration unit gives the identifier.

(3)

The power supply control device according to (2), wherein the command sending unit delivers a command to the bus line, the command instructing the battery device to charge.

(4)

The power supply control device according to (3), wherein the command sending unit delivers, to the bus line, a command for starting to charge the battery device in accordance with a remaining capacity.

(5)

The power supply control device according to (4), wherein the command sending unit delivers, to the bus line, a command for starting to charge the battery device having a least remaining capacity.

(6)

The power supply control device according to any of (2) to (5), wherein the command sending unit delivers a command to the bus line, the command instructing the battery device to discharge.

(7)

The power supply control device according to (6), wherein the command sending unit delivers, to the bus line, a command for starting to discharge the battery device in accordance with a remaining capacity.

(8)

The battery device according to claim 1, wherein, when a status where the battery device having the identifier does not respond to a command for the battery device to which the identifier is given reaches a predetermined condition, the battery registration unit deletes the identifier that is given to the battery device.

(9)

A battery device including:

a command response unit configured to receive a polling command delivered to a bus line and to respond within a predetermined response period;

an identifier obtaining unit configured to obtain an identifier given based on a response from the command response unit; and a charge and discharge control unit configured to control charge and discharge by receiving the command which is delivered to the bus line and the identifier of which is specified.

(10)

The battery device according to (9), wherein the command response unit responds to the polling command within a time frame randomly specified from one or more predetermined time frames included in the predetermined response period.

(11)

A power supply system including:

a power supply control device; and one or more battery devices, wherein the power supply control device includes a command sending unit configured to deliver a polling command to a bus line, and a battery registration unit configured to give an identifier to the battery device that has responded to the polling command within a predetermined response period, wherein the command sending unit delivers information of the identifier to the bus line for the battery device to which the battery registration unit gives the identifier and delivers, to the bus line, a command for the battery device to which the identifier is given, and wherein the battery device includes a command response unit configured to receive the polling command delivered from the power supply control device to the bus line and respond within a predetermined response period, an identifier obtaining unit configured to obtain the identifier given by the power supply control device based on a response from the command response unit, and a charge and discharge control unit configured to control charge and discharge by receiving the command which is delivered from the power supply control device to the bus line and the identifier of which is specified.

(12)

A power supply control method including:

a polling command sending step of delivering a polling command to a bus line;

a battery registration step of giving an identifier to a battery device that has responded to the polling command within a predetermined response period;

an identifier sending step of delivering information of the identifier to the bus line for the battery device to which the identifier is given in the battery registration step; and a command sending step of delivering, to the bus line, a command for the battery device to which the identifier is given.

REFERENCE SIGNS LIST

BU1 battery unit
CU1 control unit
L1 bus line
110 power supply unit
120 control unit
121 activation signal delivery unit
122 command sending unit
123 response receiving unit
124 battery registration unit
125 power supply control unit
130 memory 140 control unit
141 command response unit
142 identifier obtaining unit
143 charge and discharge control unit
150 battery
160 charging circuit
170 discharging circuit

The invention claimed is:

1. A power supply control device comprising:
a control unit configured to deliver a polling command to a bus line and to give an identifier to a battery device that has responded to the polling command within a predetermined response period,
wherein the polling command includes a maximum time slot frame as time slot information and the battery device responds to the polling command within a randomly specified time frame within the maximum time slot frame,
wherein the control unit delivers information of the identifier to the bus line for the battery device to which the control unit gives the identifier and delivers, to the bus line, a command for the battery device to which the identifier is given; and
wherein the control unit further supplies a signal to activate the battery device when the power supply control device and the battery device are connected via the bus line.

2. The power supply control device according to claim 1, further comprising: a power supply control unit configured to control charge and discharge for the battery device to which the control unit gives the identifier.

3. The power supply control device according to claim 2, wherein
the control unit delivers a command to the bus line, the command instructing the battery device to charge.

4. The power supply control device according to claim 3, wherein
the control unit delivers, to the bus line, a command for starting to charge the battery device in accordance with a remaining capacity.

5. The power supply control device according to claim 3, wherein
the control unit delivers, to the bus line, a command for starting to charge the battery device having a least remaining capacity.

6. The power supply control device according to claim 2, wherein
the control unit delivers a command to the bus line, the command instructing the battery device to discharge.

7. The power supply control device according to claim 6, wherein
the control unit delivers, to the bus line, a command for starting to discharge the battery device in accordance with a remaining capacity.

8. The power supply control device according to claim 1, wherein, when a status where the power supply control device having the identifier does not respond to a command for the power supply control device to which the identifier is given reaches a predetermined condition, the control unit deletes the identifier that is given to the battery device.

9. A battery device comprising:
a battery control unit configured to receive a polling command delivered to a bus line and to respond within a predetermined response period,
an identifier obtaining unit configured to obtain an identifier given based on a response from the battery control unit, and
a charge and discharge control unit configured to control charge and discharge by receiving the command which is delivered to the bus line and the identifier of which is specified;
wherein the polling command includes a maximum time slot frame as time slot information and the battery device responds to the polling command within a randomly specified time frame within the maximum time slot frame; and
the battery device is further configured to receive an activation signal to activate the battery device when the battery device is connected to the bus line.

10. A power supply system comprising:
a power supply control device; and
one or more battery devices,
wherein the power supply control device includes
a control unit configured to deliver a polling command to a bus line and to give an identifier to the battery device that has responded to the polling command within a predetermined response period;
wherein the control unit delivers information of the identifier to the bus line for the battery device to which the control unit gives the identifier and delivers, to the bus line, a command for the battery device to which the identifier is given;
wherein the polling command includes a maximum time slot frame as time slot information and the battery device responds to the polling command within a randomly specified time frame within the maximum time slot frame;
wherein the control unit further supplies a signal to activate the battery device when the power supply control device and the battery device are connected via the bus line;
wherein the one or more battery devices each include
a battery control unit configured to receive the polling command delivered from the power supply control device to the bus line and respond within a predetermined response period,
an identifier obtaining unit configured to obtain the identifier given by the power supply control device based on a response from the battery control unit, and
a charge and discharge control unit configured to control charge and discharge by receiving the command which is delivered from the power supply control device to the bus line and the identifier of which is specified; and
wherein the one or more battery devices are further configured to receive an activation signal to activate the respective battery device when the respective battery device is connected via the bus line.

11. A power supply control method comprising:
delivering a polling command to a bus line;
giving an identifier to a battery device that has responded to the polling command within a predetermined response period, wherein the polling command includes a maximum time slot frame as time slot information and the battery device responds to the polling command within a randomly specified time frame within the maximum time slot frame;
delivering information of the identifier to the bus line for the battery device to which the identifier is given;
delivering, to the bus line, a command for the battery device to which the identifier is given; and
activating the battery device via an activation line when the battery device is connected to the bus line.

* * * * *